United States Patent [19]

Aoki et al.

[11] Patent Number: 5,062,960
[45] Date of Patent: Nov. 5, 1991

[54] METHOD AND APPARATUS FOR RECOVERING AN ACID FROM AN ACID-CONTAINING WASTE LIQUOR

[75] Inventors: Yoshiharu Aoki; Toshikatsu Hamano, both of Chiba, Japan

[73] Assignee: Asahi Glass Company, Ltd., Tokyo, Japan

[21] Appl. No.: 551,409

[22] Filed: Jul. 12, 1990

Related U.S. Application Data

[63] Continuation-in-part of Ser. No. 429,379, Oct. 31, 1989, Pat. No. 4,954,262.

[30] Foreign Application Priority Data

Nov. 8, 1988 [JP] Japan .................................. 63-280412
Dec. 6, 1988 [JP] Japan .................................. 63-306977
Dec. 22, 1988 [JP] Japan .................................. 63-321916

[51] Int. Cl.$^5$ ..................... B01D 61/42; B01D 61/50
[52] U.S. Cl. .................................... 210/638; 210/651; 210/321.75; 210/321.84
[58] Field of Search ............... 210/638, 651, 634, 640, 210/644, 649–650, 321.72, 321.75, 321.76, 321.84, 321.85, 500.21; 204/151

[56] References Cited

U.S. PATENT DOCUMENTS 4,559,144  12/1985  Pfenninger et al. ................ 210/638

OTHER PUBLICATIONS

Patent Abstracts of Japan, vol. 3, No. 128 (C-62), Oct. 24, 1979, & JP-A-54106097 (Asahi Glass K.K.), 08.20.1979.
Patent Abstracts of Japan, vol. 1, No. 120 (C-28), Oct. 12, 1977, & JP-A-5281084 (Tokuyama Soda K.K.), 07.07.1977.
Chemical Abstracts, vol. 108, No. 12, Mar. 21, 1988, p. 552, Abstract No. 102796e, Columbus, Ohio, U.S., & JP-A-62190499 (Nippon Atomic Ind.), 08.20.1987.
Patent Abstracts of Japan, vol. 11, No. 150 (C-422) (2597), May 15, 1987, & JP-A-61284538 (Nippon Mining Co. Ltd.), 12.15.1986.
Patent Abstracts of Japan, vol. 7, No. 143 (C-172) (1288), Jun. 22, 1983, & JP-A-5858112 (Tokuyama Soda K.K.), 04.06.1983.

Primary Examiner—Frank Sever
Attorney, Agent, or Firm—Oblon, Spivak, McClelland, Maier & Neustadt

[57] ABSTRACT

An apparatus for recovering an acid from an acid-containing waste liquor, which is a diffusion dialytic cell having a plurality of anion exchange membranes disposed to alternately form feed liquor compartments to which the acid-containing waste liquor is supplied and recovery compartments to which water is supplied, wherein a cooling compartment defined by a water-impermeable membrane is provided adjacent to such feed liquor compartments or recovery compartments.

8 Claims, 1 Drawing Sheet

METHOD AND APPARATUS FOR RECOVERING AN ACID FROM AN ACID-CONTAINING WASTE LIQUOR

This application is a continuation-in-part application of Ser. No. 07/429,379 having a filing date of Oct. 31, 1989 Now U.S. Pat. No. 4954262.

BACKGROUND OF THE INVENTION

1. Field of the Invention

The present invention relates to novel method and apparatus for efficiently recovering a free acid from an acid-containing waste liquor, especially from an acid-containing waste liquor having a high acid concentration.

2. Discussion of Background

As a method for recovering an acid from an acid-containing waste liquor, diffusion dialysis employing anion exchange membranes has been proposed and has been practically employed to some extent. However, when such a method is practically put in operation, heat of diffusion is likely to accumulate, and the temperature rise takes place, thus leading to problems such as a deterioration of the ion exchange membranes and heat deformations of parts constituting the diffusion dialytic cell. Thus, it has been difficult to conduct a consistent operation for a long period of time. It has also been proposed to preliminarily cool the acid-containing waste liquor and water for recovery before their supply in order to control the temperature level within such a range that no problem will be created even when heat of dilution has accumulated in the diffusion dialytic cell. However, it has been found that the heat accumulation is unexpectedly so high that the preliminal cooling of the waste liquor or water must be great. As the result, the recovered acid also becomes cold and, it is necessary to reheat it when the acid is used at fairly high temperature. Thus, this method has been found to be ineffective from the viewpoint of the energy consumption. Further, a multistage dialytic method has been proposed as an idea to solve the problem by reducing the heat generation by dilution per unit dialytic cell. However, such a method has a problem that the installation cost increases. Thus, the commercial operation of such a method has been found to be difficult.

There has been no effective method other than the ion exchange membrane method. Thus, in spite of high concentration of a valuable acid content, the waste liquor has had to be disposed. Yet, it is required to neutralize such a waste liquor with an alkali before disposition to avoid pollution, and the cost required for such treatment has been substantial.

SUMMARY OF THE INVENTION

It is an object of the present invention to provide novel method and apparatus, whereby a free acid in such an acid-containing waste liquor of high concentration can be efficiently recovered.

The present inventors have measured the temperature distribution in a diffusion dialytic cell when an acid-containing waste liquor is subjected to diffusion dialysis against water by means of anion exchange membranes and have found the following facts. Namely, it has been found that a very high peak temperature appears at about the central portion in the vertical direction, and the temperature rise may reach a level as high as from 50° to 60° C. depending upon the operational condition. However, at the same time, it has been found that by changing the operational condition e.g. the ratio of the flow rate of the acid-containing waste liquor to the flow rate of the water for recovery, the position of this peak temperature can be moved up or down, and the peak temperature itself can be lowered. This indicates that the position and the temperature of the peak temperature are determined by the relation between the heat capacity of the acid-containing waste liquor as the ascending stream and the heat capacity of the water for recovery as the descending stream. Thus, the present inventors have found it possible to easily control the peak temperature by introducing a third heat transfer medium into the diffusion dialytic cell to destroy the balance of the heat quantities of the ascending and descending streams and thereby conduct a consistent operation for a long period of time.

Thus, the present invention resides in a method for recovering an acid from an acid-containing waste liquor in a diffusion dialytic cell having a plurality of anion exchange membranes disposed therein, wherein the temperature rise in the diffusion dialytic cell is controlled by supplying a third heat transfer medium (cooling water) as shown in FIG. 2.

Namely, the present invention provides an apparatus for recovering an acid from a acid-containing waste liquor, which is a diffusion dialytic cell having a plurality of anion exchange membranes disposed to alternately form feed liquor compartments to which the acid-containing waste liquor is supplied and recovery compartments to which water is supplied, wherein a cooling compartment defined by a water-impermeable membrane is provided adjacent to such feed liquor compartments or recovery compartments.

Further, the present invention provides a method for recovering an acid from an acid-containing waste liquor by diffusion dialysis in a diffusion dialytic cell having a plurality of anion exchange membranes disposed to alternately form feed liquor compartments to which the acid-containing waste liquor is supplied and recovery compartments to which water is supplied, which comprises supplying a cooling medium to a cooling compartment defined by a water-impermeable membrane and provided adjacent to such feed liquor compartments or recovery compartments, to conduct the diffusion dialysis while suppressing the temperature rise in the diffusion dialytic cell.

In the present invention, the temperature of the dialytic cell may be represented by either the temperature of the acid-containing waste liquor in the feed liquor compartments or the temperature of the water in the recovery compartments, since the heat exchange in the dialytic cell should sufficiently be conducted by ion exchange membranes.

DETAILED DESCRIPTION OF THE PREFERRED EMBODIMENTS

Figure 1:
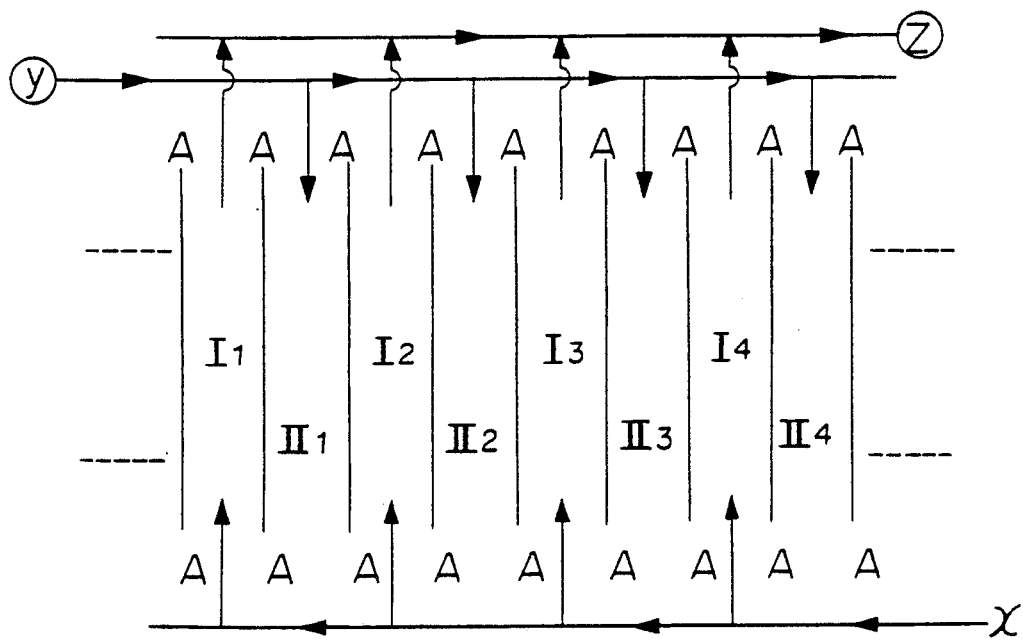
FIG. 1 illustrates the principle of the diffusion dialysis.

In the present invention, the principle of recovering sulfuric acid in an acid-containing waste liquor in a diffusion dialytic cell is illustrated in FIG. 1. In FIG. 1, A indicates an anion exchange membrane. Anion exchange membranes are disposed as shown in the Figure to form a plurality of partitioned compartments. As an apparatus having such a construction, various types may be used. However, it is particularly preferred to employ a so-called filter press type dialytic cell wherein a plurality of anion exchange membranes are disposed between clamping frames with opened center portions to form dialytic compartments by means of compartment frames having liquid supply and discharge mechanisms and spacers, and the entire assembly is clamped to form a cell (as disclosed in e.g. Japanese Examined Patent Publication No. 34119/1973 and Japanese Unexamined Patent Publication No. 141803/1981).

As the anion exchange membranes for the present invention, from weakly basic type to strongly basic type anion exchange membranes can be used. Preferably, a styrene-divinylbenzene copolymer or a vinyl-pyridinedivinylbenzene copolymer having a base of a quaternary ammonium salt as ion exchange groups, may be used. Such anion exchange membranes preferably have an ion exchange capacity of from 2.0 to 5.0, particularly from 3.0 to 4.0, meq/g dry resin for efficient recovery of acid.

Referring to FIG. 1, the acid-containing waste liquor $(x)$ is supplied to alternate dialytic compartments $I_1$, $I_2$, $I_3$ and $I_4$, as shown in the Figure, at a rate of from 0.5 to 2.0 l/hr·m², while water $(y)$ is supplied to recovery compartments $II_1$, $II_2$, $II_3$ and $II_4$ adjacent to the respective dialytic compartments partitioned by anion exchange membranes, at substantially the same flow rate as the above acid-containing waste liquor. The acid-containing waste liquor and water are preferably supplied counter-currently rather than in a concurrent flow fashion, so that a substantial gradient in the concentration of acid is always maintained with the anion exchange membranes disposed therebetween.

Thus, the acid-containing waste liquor and water will face each other as partitioned by the anion exchange membranes. The treated solution $(z)$ having the acid removed by the dialysis, is then discharged out of the system.

In the present invention, the following dialytic cell is preferably employed to control the temperature of the dialytic cell to a level lower than the above-mentioned prescribed temperature. Namely, in the above-mentioned dialytic cell, a cooling compartment defined by water-impermeable membranes is provided adjacent to the above-mentioned feed liquor compartments or recovery compartments. The water-impermeable membrane is preferably a film having preferably a water absorptivity (ASTM D-570, 24 hours) of not higher than 0.1%, preferably less than 0.01% and having preferably a thickness of from 50 to 300 μm, preferably from 100 to 250 μm. The size of the film may be the same as the size of the ion exchange membranes. Eventually, the cooling compartment preferably has the same thickness and size as the feed liquor compartment or recovery compartment.

Figure 2:
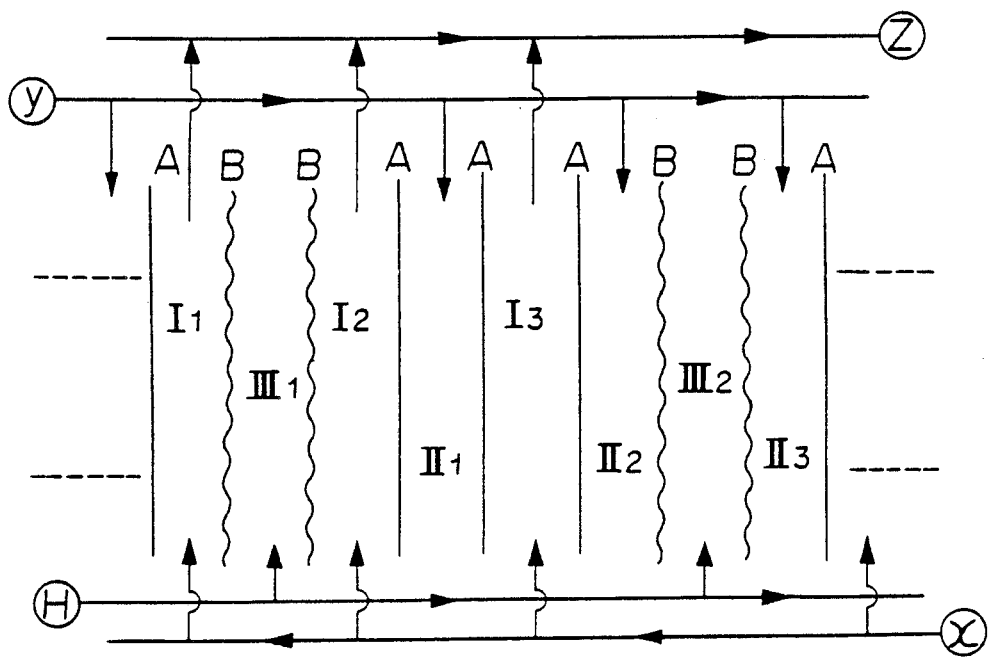
FIG. 2 illustrates the construction of a diffusion dialytic cell whereby the diffusion dialysis is conducted by controlling the temperature according to the present invention.

FIG. 2 illustrates an arrangement of the membranes of a diffusion dialytic cell having cooling compartments, constructed as described above. In FIG. 2, the same symbols as used in FIG. 1 indicate the same members. In FIG. 2, reference numerals $III_1$ and $III_2$ indicate cooling compartments defined by water-impermeable membranes B. The cooling compartment may be adjacent to the feed liquor compartments $I_1$ and $I_2$ as shown by $III_1$, or may be adjacent to the recovery compartments $II_2$ and $II_3$ as shown by $III_2$. Into the cooling compartments, a cooling medium $(H)$ such as purified water, city water or the acid-containing feed liquor is supplied. The temperature of cooling compartment is preferably lower by from 2° to 10° C., preferably from 2° to 4° C. than the temperature of the feed liquor compartments or the recovery compartments, although such may vary depending upon the desired temperature of the dialytic cell.

The number of cooling compartments in a dialytic cell varies depending upon the temperature of the dialytic cell to be controlled. However, it is usually preferably from 0.5 to 0.02, preferably from 0.15 to 0.1 unit per unit number of the feed liquor compartment or recovery compartment. The cooling compartments may not necessarily be provided with regular intervals or distances. However, in order to maintain the dialytic cell, the feed liquor compartment or the recovery compartment at a uniform temperature, preferably less than 60° C., especially 40° C., they are preferably provided with predetermined intervals or distances.

There is no particular restriction as to the material for the water-impermeable membrane forming the cooling compartment. However, from the viewpoint of the corrosion resistance and costs, polyvinyl chloride, polyethylene or polypropylene is preferably employed. The cooling compartment may not necessarily be defined by water-impermeable membranes at both sides, and only one side may be defined by a water-permeable membrane, an anion exchange membrane or a cation exchange membrane. However, in order to avoid the mixing with the dialytic feed liquor or with the recovered solution, it is preferred that both sides are defined by the water-impermeable membranes.

In a present invention, the waste liquor containing an acid such as sulfuric acid, hydrochloric acid, nitric acid, acid mixture thereof can be treated. When the concentration of free acid in the waste liquor is usually at least 3N, especially 5N, the present invention is effectively applied.

In a case of a waste liquor from an electrolytic etching step of aluminum foils for capacitors, the waste liquor contains from 20 to 30% of an aluminum component and an acid mixture of sulfuric acid and hydrochloric acid at a free acid concentration of from 5 to 7N. According to the present invention, it is possible to recover the acids of from 5 to 7N containing no substantial aluminum component consistently over a long period of time without a deterioration of ion exchange membranes or without a problem such as heat deformations of parts constituting the dialytic cell.

The titanium sulfate waste liquor to be treated by the present invention is the one discharged from the process for producing titanium by a sulfuric acid method. The waste liquor usually contains from 5 to 20 g/l of a titanium component (as $TiO_2$, the majority is dissolved in the form of $TiO—SO_4$) and from 200 to 400 g/l of sulfuric acid. According to the present invention, up to 90% of sulfuric acid in such a titanium sulfate waste liquor can be recovered as pure sulfuric acid (concentration: 200 to 400 g/l) for the first time on an industrial scale. Therefore, the method of the present invention is extremely useful.

Now, the present invention will be described in further detail with reference to Examples. However, it should be understood that the present invention is by no means restricted to such specific Examples.

EXAMPLE 1

A waste liquor of an acid mixture of sulfuric and hydrochloric acids from the etching step of aluminum foils (containing 7.05N of free acids and 17 g/l of Al) was introduced from below to the feed liquor compartments of the diffusion dialytic cell as shown in FIG. 2 at a flow rate of 791 l/hr, while water was introduced from above to the recovery compartments of the diffusion dialytic cell at a flow rate of 673 l/hr.

In the diffusion dialytic cell, 880 sheets of anion exchange membrane (a strongly basic styrene-divinylbenzene copolymer) and 576 sheets of polyvinylchloride (water absorptivity: less than 0.1%, thickness: 200 μm) were incorporated, and cooling compartments were regularly disposed so that the cooling compartments were 0.2 compartment per unit number of the feed liquor compartment (or the recovery compartment).

On the other hand, cooling water at a temperature of 25° C. was supplied from below to the cooling compartments at a rate of 3,500 l/hr.

As a result, 6.95N of an acid mixture of sulfuric acid and hydrochloric acid was obtained as recovered acids at a rate of 605 l/hr, and the recovery rate reached 75%. The temperature of the dialytic cell at that time was 27° C. at the upper portion of the recovery compartment and 30° C. at the center portion. A continuous operation was conducted for about six months, whereupon the dialytic performance was stable, and the dialytic cell was disassembled to inspect the ion exchange membranes, whereby no abnormality was observed.

COMPARATIVE EXAMPLE 1

Diffusion dialysis was conducted under the same condition as in Example 1 except that the supply of cooling water to the cooling compartments was stopped, whereby at the initial stage of the operation, 7.0N of an acid mixture of sulfuric acid and hydrochloric acid was obtained as recovered acids at a rate of 610 l/hr. The recovery rate was 77%, and the separation rate of Al was 96%.

However, when the operation was continued, the performance decreased gradually. Upon expiration of about 3 months, the separation rate of Al decreased to a level of 81%, although the acid recovery rate was 77%. At that time, the temperature of the dialytic cell was at a level of from 25° to 26° C. at the upper and lower portions, but as high as 65° C. at the central portion, thus clearly indicating the heat accumulation. The ion exchange membranes were inspected, whereby a deterioration of the resin of the membranes was observed in a strip shape with a width of about 20 cm at about the ⅓ portion from the top of the dialytic cell, and this was found to be the cause for the decrease of the Al separation rate.

EXAMPLE 2

A titanium sulfate waste liquor ($H_2SO_4$: 291 g/l, Ti: 5 g/l) from the process for the production of titanium oxide by a sulfuric acid method, was introduced from below to the feed liquor compartments of the diffusion dialytic cell as shown in FIG. 2 at a flow rate of 1,162 l/hr, while water was introduced from above to the recovery compartments of the diffusion dialytic cell at a flow rate of 960 l/hr.

In the diffusion dialytic cell, 880 sheets of anion exchange membrane (a strongly basic styrenedivinylbenzene copolymer) and 352 sheets of polyvinylchloride (water absorptivity: less than 0.1%, thickness: 200 μm) were incorporated, and cooling compartments were regularly disposed so that the cooling compartments were 0.4 compartment per unit number of the feed liquor compartment (or the recovery compartment).

On the other hand, cooling water at a temperature of 25° C. was supplied from below to the cooling compartments at a rate of 3,500 l/hr.

As a result, 247 g/l of sulfuric acid was obtained as a recovered acid at a rate of 882 l/hr, and the recovery rate reached 71%. The temperature of the dialytic cell at that time was 25° C. at the upper portion of the recovery compartment and 28° C. at the center portion. A continuous operation was conducted for about one month, whereupon the dialytic performance was stable, and the dialytic cell was disassembled to inspect the ion exchange membranes, whereby no abnormality was observed.

COMPARATIVE EXAMPLE 2

Diffusion dialysis was conducted under the same condition as in Example 2 except that the supply of cooling water to the cooling compartments was stopped, whereby at the initial stage of the operation 276 g/l of sulfuric acid was obtained as the recovered acid at a rate of 882 l/hr, and the recovery rate reached 72%.

However, when the operation was continued, the performance decreased gradually. Upon expiration of about one month, the acid concentration decreased to a level of 230 g/l, and the recovery rate also decreased to a level of 60%. At that time, the temperature of the dialytic cell was at a level of from 25° to 26° C. at the upper and lower portions, but as high as 40° C. at the central portion, thus clearly indicating the heat accumulation. The ion exchange membranes were inspected, whereby precipitation of titanium dioxide was observed in a strip shape with a width of about 20 cm at the ⅓ portion of the upper membrane portion on the side facing the feed liquor compartment, and this precipitation was found to be the cause for the deterioration of the performance.

What is claimed is:

1. An apparatus for recovering an acid from an acid containing waste liquor which overcomes the problem of heat accumulation in diffusion dialysis of waste acid liquor as a result of temperature increase which results in deterioration of the ion exchange membranes of the dialysis cell and heat deformation of cell parts all of which limit the operational life of the cell, comprising;
   a diffusion dialysis cell divided into a plurality of alternating feed liquor compartments into which feed liquor is supplied and recovery compartments into which water is supplied by a plurality of anion exchange membranes, said cell being provided with a plurality of cooling compartments into which cooling water is supplied by the positioning of water-impermeable membranes in the cell such that said cooling compartments are adjacent to the feed liquor compartments or the recovery compartments, thereby controlling the temperature increases in the cell and extending the lifetime of the cell.

2. The apparatus according to claim 1, wherein the cooling compartments are provided from 0.5 to 0.02 units per unit number of the feed liquor compartments or recovery compartments.

3. The apparatus according to claim 1, wherein the temperature of the feed liquor compartments or recovery compartments is maintained at a level of less than 60° C., while the temperature of the cooling compartment is maintained at a level lower by 2° to 10° C. than that of the feed liquor compartments or recovery compartments.

4. The apparatus according to claim 1, wherein the water-impermeable membrane is a film having a water absorptivity of not higher than 0.1% and a thickness of from 50 to 300 μm.

5. A method for recovering an acid from an acid-containing waste liquor which overcomes the problem of heat accumulation in diffusion dialysis of waste acid liquor as a result of temperature increase which results in deterioration of the ion exchange membranes of the dialysis cell and heat deformation of cell parts all of which limit the operational life of the cell, comprising; conducting diffusion dialysis in a diffusion dialysis cell divided into a plurality of alternating feed liquor compartments into which feed liquor is supplied and recovery compartments into which water is supplied by a plurality of anion exchange membranes, said cell being provided with a plurality of cooling compartments into which cooling water is supplied by the positioning of water-impermeable membranes in the cell such that said cooling compartments are adjacent the feed liquor compartments thereby controlling the temperature increases in the cell and extending the lifetime of the cell.

6. The method according to claim 5, wherein the anion exchange membranes have an ion exchange capacity of from 2 to 5 meq/g dry resin.

7. The method according to claim 5, wherein the diffusion dialysis is conducted by supplying the acid-containing waste liquor and the water counter-currently at a flow ratio of 2/1 to 0.5/1 with the anion exchange membranes interposed between them.

8. The method according to claim 5, wherein the acid is sulfuric acid, hydrochloric acid, nitric acid or an acid mixture containing these acids as the main components, and the concentration of the free acid in the acid-containing waste water is at a level of at least 3.0N.

* * * * *